(12) United States Patent
Minervino et al.

(10) Patent No.: US 11,828,184 B2
(45) Date of Patent: Nov. 28, 2023

(54) METHOD FOR MANUFACTURING A COMPOSITE PLATFORM FOR AN AIRCRAFT TURBINE ENGINE FAN

(71) Applicant: SAFRAN AIRCRAFT ENGINES, Paris (FR)

(72) Inventors: Matteo Minervino, Moissy-Cramayel (FR); François Charleux, Moissy-Cramayel (FR); Didier Fromonteil, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/908,065

(22) PCT Filed: Feb. 19, 2021

(86) PCT No.: PCT/FR2021/050297
§ 371 (c)(1),
(2) Date: Aug. 30, 2022

(87) PCT Pub. No.: WO2021/176160
PCT Pub. Date: Sep. 10, 2021

(65) Prior Publication Data
US 2023/0102713 A1 Mar. 30, 2023

(30) Foreign Application Priority Data
Mar. 3, 2020 (FR) ...................................... 2002129

(51) Int. Cl.
*F01D 11/00* (2006.01)
*B29C 70/24* (2006.01)
(Continued)

(52) U.S. Cl.
CPC ............ *F01D 11/008* (2013.01); *B29C 70/24* (2013.01); *B29C 70/72* (2013.01); *F01D 5/147* (2013.01);
(Continued)

(58) Field of Classification Search
CPC . F01D 5/14; F01D 5/141; F01D 5/143; F01D 5/147; F01D 11/005; F01D 11/006;
(Continued)

(56) References Cited

U.S. PATENT DOCUMENTS 5,466,125 A * 11/1995 Knott .................... F01D 5/3007
416/193 A
10,557,361 B1 * 2/2020 Karkos ..................... B32B 3/26
(Continued)

FOREIGN PATENT DOCUMENTS

| EP | 3 536 909 A1 | 9/2019 |
| FR | 2 988 427 A1 | 9/2013 |

(Continued)

OTHER PUBLICATIONS

International Search Report dated May 11, 2021, issued in corresponding International Application No. PCT/FR2021/050297, filed Feb. 19, 2021, 6 pages.
(Continued)

*Primary Examiner* — Elton K Wong
(74) *Attorney, Agent, or Firm* — CHRISTENSEN O'CONNOR JOHNSON KINDNESS PLLC

(57) ABSTRACT

A composite platform for an aircraft turbine engine fan includes a wall of elongate shape that is configured to extend between two fan blades. The wall has an aerodynamic external face and an internal face on which is disposed a fixing tab configured to be fixed to a fan disc. A method for manufacturing the composite platform includes the steps of: a) producing a preform by three-dimensionally weaving of
(Continued)

fibers, b) unbinding some of the fibers of the preform to detach at least one longitudinal layer of fibers from the rest of the preform, c) inserting a metal reinforcement between this layer and the rest of the preform, and d) injecting a resin into the preform so as to form said wall and secure the reinforcement to this wall.

9 Claims, 4 Drawing Sheets

(51) Int. Cl.
    *B29C 70/72*    (2006.01)
    *F01D 5/14*     (2006.01)
    *F01D 5/28*     (2006.01)

(52) U.S. Cl.
    CPC .......... *F01D 5/282* (2013.01); *F05D 2220/36* (2013.01); *F05D 2240/80* (2013.01); *F05D 2250/712* (2013.01); *F05D 2300/44* (2013.01); *F05D 2300/6034* (2013.01)

(58) Field of Classification Search
    CPC ....... F01D 11/008; B29C 70/24; B29C 70/72; F05D 2240/80; F05D 2300/44; F05D 2300/6034; F05D 2250/712; F05D 2220/36

See application file for complete search history.

(56) References Cited

U.S. PATENT DOCUMENTS

| | | | |
|---|---|---|---|
| 2019/0277145 A1* | 9/2019 | Theertham | F04D 19/002 |
| 2019/0277150 A1* | 9/2019 | Theertham | F01D 11/008 |

FOREIGN PATENT DOCUMENTS

| | | |
|---|---|---|
| FR | 3 018 473 A1 | 9/2015 |
| FR | 3 082 876 A1 | 12/2019 |
| WO | 2013/104853 A2 | 7/2013 |

OTHER PUBLICATIONS

Written Opinion dated May 11, 2021, issued in corresponding International Application No. PCT/FR2021/050297, filed Feb. 19, 2021, 5 pages.

* cited by examiner

METHOD FOR MANUFACTURING A COMPOSITE PLATFORM FOR AN AIRCRAFT TURBINE ENGINE FAN

FIELD OF THE DISCLOSURE

The present disclosure relates to a method for manufacturing a composite platform for an aircraft turbine engine fan.

BACKGROUND

The technical background comprises in particular the documents FR-A1-2 988 427, WO-A2-2013/104853, FR-A1-3 082 876 and FR-A1-3 018 473.

Referring to FIG. 1, which shows a partial cross-sectional view of a fan rotor 1 of an aircraft turbine engine, it is known from the prior art that a fan rotor 1 having an axis of rotation and comprising a fan casing, a fan disc 2, fan blades 3 or vanes comprising, as a retention device, roots sleeved into alveoli in the periphery of the disc 2. Each blade 3 comprises an intrados, an extrados, a leading edge 3a and a trailing edge 3b.

The fan rotor 1 comprises platforms 4b interposed between the fan blades 3 and attached to the periphery of the disc 2. Each platform 4b comprises an aerodynamic external face 4c extending along the axis substantially from the leading edges 3a to the trailing edges 3b of the blades 3 between which this platform 4b is mounted.

Finally, the rotor 1 comprises an upstream cone 13, an upstream shroud 14 and a downstream shroud 15, the two shrouds 14, 15 being secured to the fan disc 2.

Such a fan rotor is known in particular from the document EP-A1-1 970 537.

Each platform must provide an aerodynamic function that is its primary function and a definition of the flow duct of the air.

In addition, each platform must meet all the operating conditions, i.e., ensure the performance for the entire operating envelope, e.g., a flight for an aircraft, ensure the safety requirements, and ensure the availability of the rotor as portion of the engine for a commercial use.

As far as safety is concerned, each platform must be able to absorb a significant amount of energy by crushing its lateral edges, which run along an intrados of a vane and an extrados of an adjacent vane.

It is known to produce fan vanes made of composite material, the use of composite material in the aeronautical field being particularly interesting for their mechanical properties and their gains in mass compared to a metal alloy.

The platforms are generally made of metal alloy. However, it is not conceivable to use metallic platforms with composite vanes because the risk of wear and weakening of the vanes is too high due to the metal-composite contacts.

It has therefore already been proposed to make fan platforms made of composite material. However, the currently known technologies are not entirely satisfactory, in particular because the manufacturing method is long and complex and involves a significant production cost.

The present disclosure proposes to solve at least some of these problems in a simple, effective and economical manner.

SUMMARY

The present disclosure relates to a method for manufacturing a composite platform for an aircraft turbine engine fan, this platform comprising a wall of elongated shape and configured to extend between two fan vanes, this wall comprising an aerodynamic external face and an internal face on which is located an attachment tab configured to be attached to a fan disc, characterised in that it comprises the steps of:
a) making a preform by three-dimensional weaving of fibres, this preform having an elongated shape along an axis of elongation,
b) unbinding a portion of the fibres of the preform along the axis, from a longitudinal end of the preform, so as to disengage at least one longitudinal layer of fibres from the remainder of the preform, the at least one layer of fibres being separated from the remainder of the preform by a longitudinal space,
c) inserting a metallic framework (36) into this longitudinal space from the longitudinal end of the preform, this framework being formed in one part with the attachment tab and being positioned in the space according to the desired position of this tab, and
d) injecting a thermosetting or thermoplastic resin into the preform so as to form the wall and to secure the framework to the wall.

The platform according to the disclosure is designed to reduce its mass while increasing its stiffness and its service life. It is relatively simple to manufacture, by assembling a framework with a preform into which a resin is to be injected. There is no particular mechanical assembly step, such as screwing, which simplifies the manufacturing and reduces the cost of manufacturing the part.

The method according to the disclosure may comprise one or more of the following characteristics, taken alone or in combination with each other the framework comprises a substantially flat plate housed in the space and interposed between the at least one layer and the remainder of the preform;

the plate is interposed between two layers of fibres and the remainder of the preform, the two layers being substantially coplanar and being separated from each other by a slit which opens into the space and through which the attachment tab extends;

the attachment tab is connected to the plate by fillets that are covered by a portion of the at least one layer; and the at least one layer is connected to the remainder of the preform by at least one woven edge.

The present disclosure also relates to a composite platform for an aircraft turbine engine fan, this platform being manufactured by a method as described above, this platform being devoid of mechanical elements for attaching the framework to the preform and to the platform, and the external face being devoid of orifices for mounting such elements.

Preferably, the framework comprises a plate that extends along the wall and is connected to the attachment tab, this plate being spaced from the upstream and downstream ends of the wall.

Advantageously, the wall comprises a lateral edge that is concave curved and an opposite lateral edge that is convex curved, the plate comprising two lateral edges that are set back from the lateral edges of the wall.

The present disclosure also relates to an aircraft turbine engine, characterised in that it comprises a fan comprising a disc carrying vanes and platforms as described above.

DESCRIPTION OF THE DRAWINGS

Other characteristics, purposes and advantages of the present disclosure will become apparent from the following detailed description and from the attached drawings, which are given as non-limiting examples and in which.

DETAILED DESCRIPTION

Figure 1:
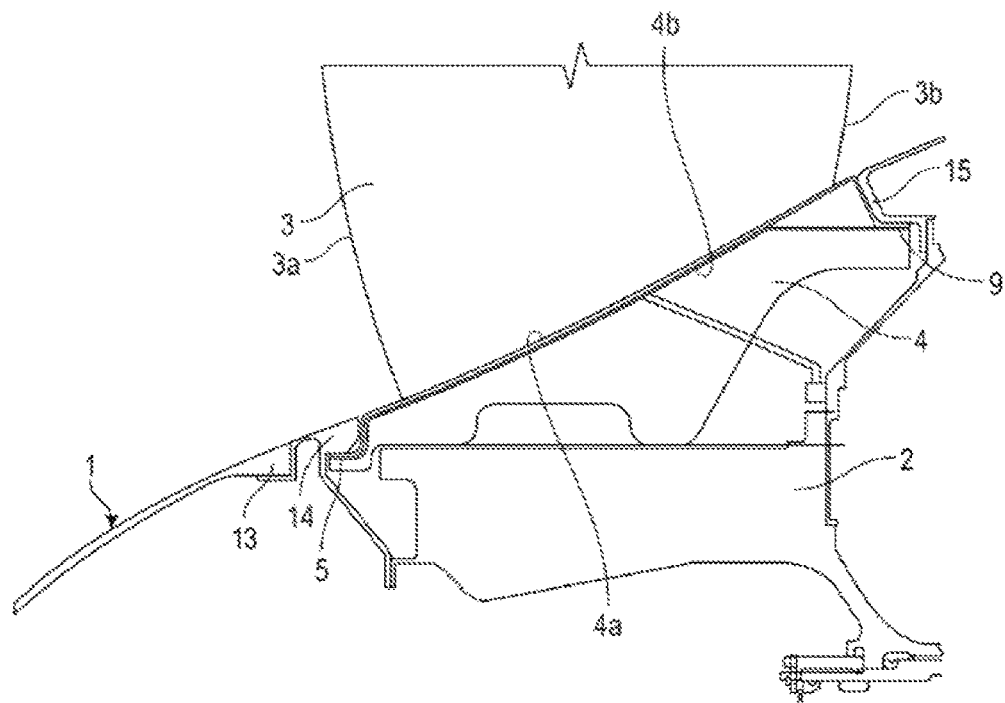
FIG. 1 is a schematic axial sectional view of a fan rotor according to the prior art.
Figure 2:
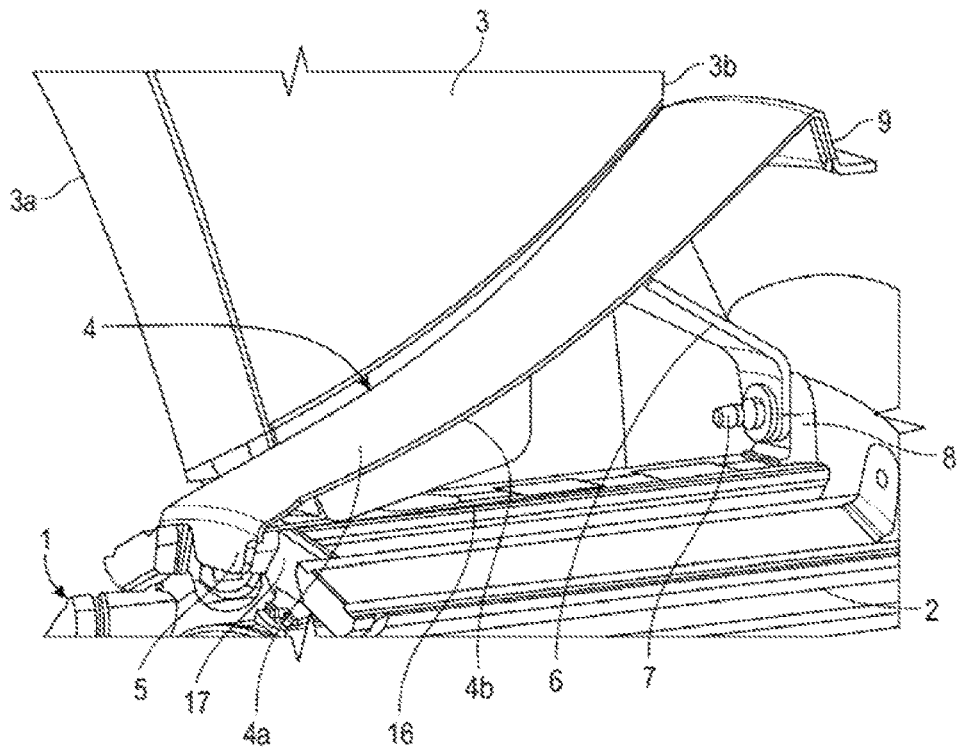
FIG. 2 is a schematic perspective view of the fan rotor in FIG. 1.

FIG. 1 has been described above and FIG. 2 shows a perspective view of a portion of the fan rotor 1 in FIG. 1. FIGS. 1 and 2 illustrate the prior art.

The rotor 1 is mounted to rotate about an axis of rotation and comprises a fan disc 2 and fan blades 3 comprising roots sleeved into alveoli in the periphery of the disc 2, only one blade 3 of which is visible in FIG. 2. Each blade 3 comprises an intrados, an extrados, a leading edge 3a and a trailing edge 3b.

A periphery of the disc 2 is advantageously toothed by being equipped with teeth 16, advantageously of trapezoidal cross-section and extending axially on the disc 2 with respect to the axis of rotation of the rotor 1. At least one wedge 17 is provided on the upstream side between two adjacent teeth 16 which form an alveole for receiving a root of a blade 3, this wedge 17 being intended to axially block the blade root in its corresponding alveole.

Platforms 4 are interposed between the fan blades 3 and attached to the periphery of the disc 2. Each platform 4 can therefore be interposed between two consecutive fan blades 3.

Each platform 4 comprises an internal face 4b (or radially internal with reference to the axis) and an aerodynamic external face 4a. These faces 4a, 4b extend along the axis substantially from the leading edges 3a to the trailing edges 3b of the two blades 3 between which this platform 4 is mounted.

At its upstream end (with reference to the flow of gases in the fan and the turbine engine), each platform 4 comprises a rim 5 for attachment or hooking to the disc 2. A similar rim 9 is located at the downstream end of each platform 4.

The internal face 4b of each platform 4 is connected to an attachment tab 6 on a flange 8 of the disc 2. This tab 6 extends radially inwards and comprises at its radially internal free end an orifice for the passage of a screw 7 for attaching the tab and the platform 4 to the flange 8 and thus to the disc 2.

The platform 4 visible in FIGS. 1 and 2 is made of a single part of metal alloy, and the present disclosure proposes a composite platform that can be used, for example, with fan vanes also made of composite.

Figure 3:
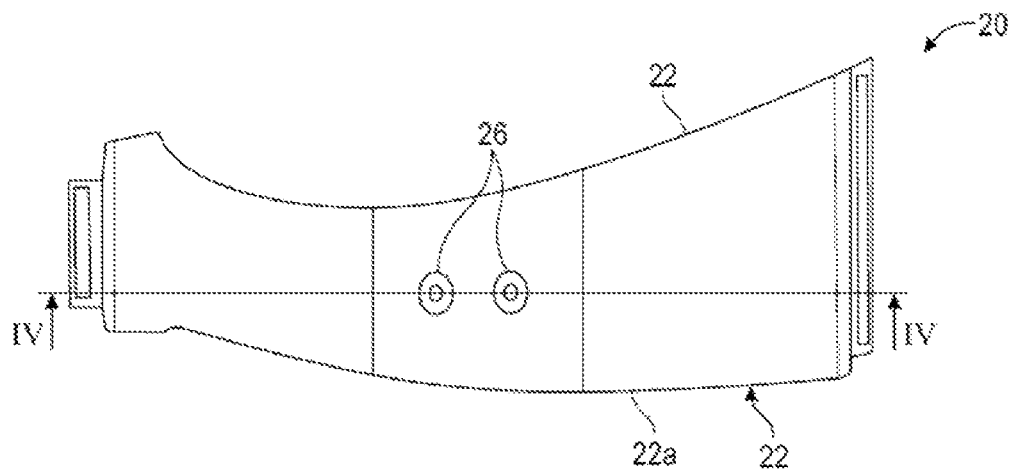
FIG. 3 is a schematic perspective view of a composite platform, seen from above or from the outside and which does not make part of the disclosure.
Figure 4:
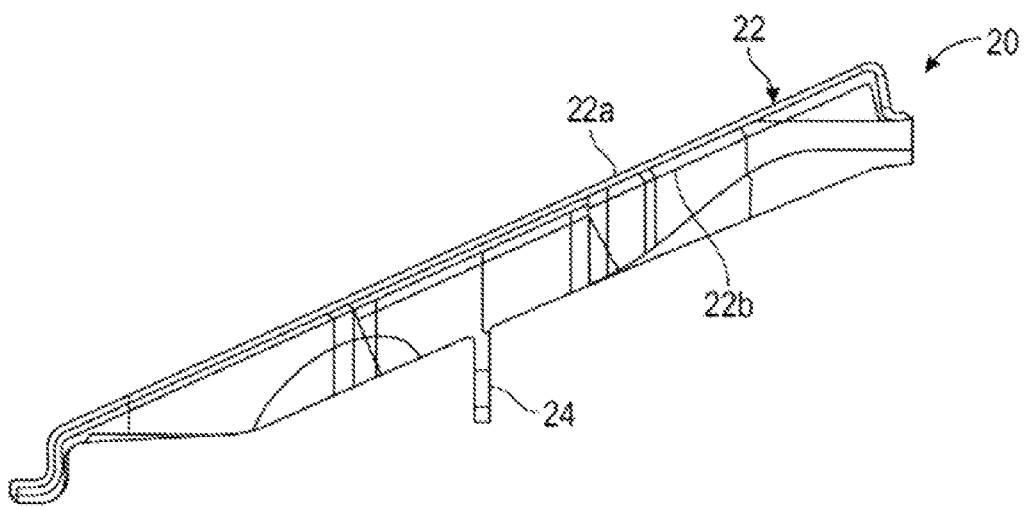
FIG. 4 is a schematic cross-sectional view along the line IV-IV of FIG. 3.
Figure 5:
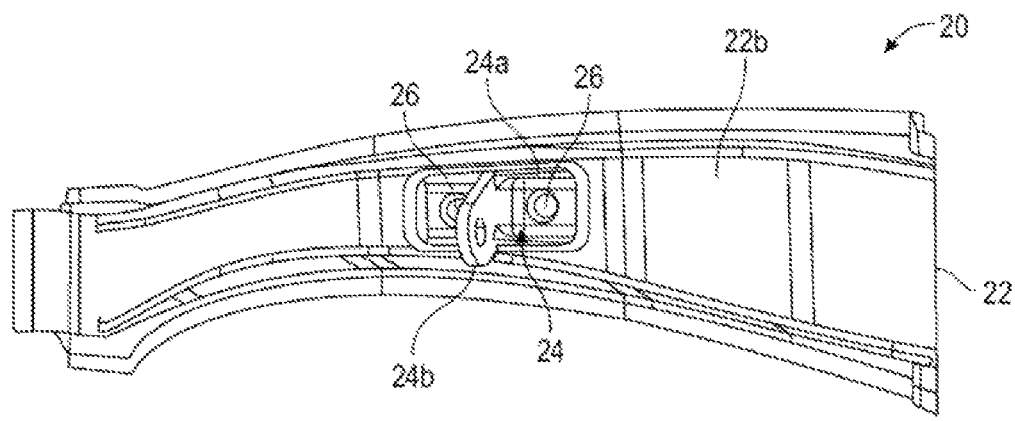
FIG. 5 is another schematic perspective view of the platform in FIG. 3, seen from below or from the inside.

FIGS. 3 to 5 describe an example embodiment of a composite platform that is not part of the disclosure.

The composite platform 20 of FIGS. 2 to 5 comprises an elongated wall 22 configured to extend between two fan vanes.

This wall 22 comprises an aerodynamic external face 22a and an internal face 22b on which is located an attachment tab 24 similar to the tab 6 described above.

The attachment tab 24 is made of a metal alloy and comprises a hub 24a connected to an ear 24b pierced with an orifice 24c for the passage of a screw (similar to the screw 7 described above).

The hub 24a is flat and is applied to the internal face 22b of the wall 22.

The wall 22 is made of a composite material from a resin. The wall 22 comprises, substantially in the middle, orifices that are aligned with orifices in the hub 24a and that receive screws 26 for attaching the tab 24 to the wall 22. Each screw 26 comprises a head, preferably countersunk, engaged in a recess of the external face 22a of the wall, and a threaded rod on which is screwed a nut bearing on the hub 24a.

This composite platform technology is not entirely satisfactory because it has disadvantages.

The positioning of the tab 24 on the wall 22 requires a high degree of precision (and therefore a high cost) in order to respect the geometrical constraints imposed by aerodynamics. In addition, the screw heads 26 must be covered in order to maintain the aerodynamic geometry of the duct, which also generates an additional cost by adding a covering step that is delicate and complex to control. In addition, the fact that the screw heads are covered with a coating makes it more difficult to locate them for eventual dismounting of the tab and removal of the platform for its replacement, for example.

Each platform 20 has a large mass, about 1 kilogram each, for example a fan rotor comprising eighteen platforms 20.

An allowance of the wall 22 at the level of the screws 26 and the hub 24a is necessary to reduce the caulking force in the wall, generated by its clamping; clamping which must also resist the centrifugal forces seen by the part: the clamping shape must be greater than the sum of the caulking and centrifugal forces ($F_{clamping} > F_{caulking} + F_{centrifugal}$).

The clamping force is all the more difficult to maintain because the countersunk heads of the screws 26 cannot support washers in line with their heads, which contributes to a poor distribution of clamping forces and requires a smaller volume of material.

The geometrical behaviour of each platform 20 during the engine operation as a result of centrifugal forces. The slightest deformation causes the fan to lose efficiency. Similarly, the use of screws 26 with countersunk head reduces the volume of material loaded by the assembly and significantly increases local constraints, especially at the level of the screw heads.

These last two points generate the need for a very controlled tightening of screws (torque wrench) and therefore expensive.

The durability following the covering step for the screw head. In principle, the part should last the entire life of the engine without deterioration. The erosion combined with local constraints cast doubt on the possibility of meeting this criterion.

Figure 6:
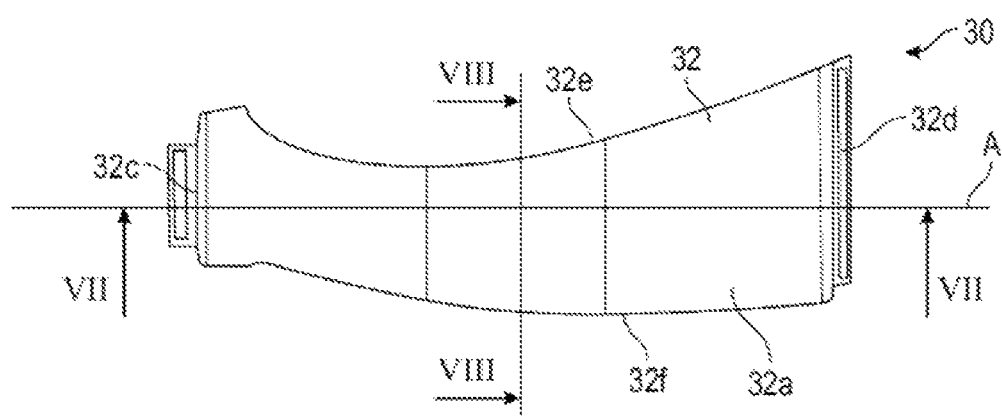
FIG. 6 is a schematic perspective view of a composite platform according to one embodiment of the disclosure.
Figure 7:
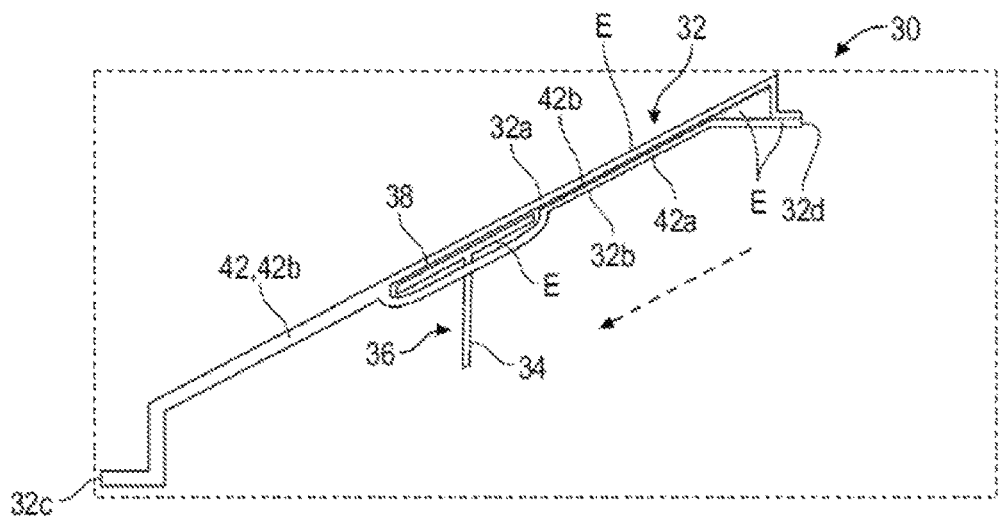
FIG. 7 is a schematic cross-sectional view along the line VII-VII of FIG. 6.
Figure 8:
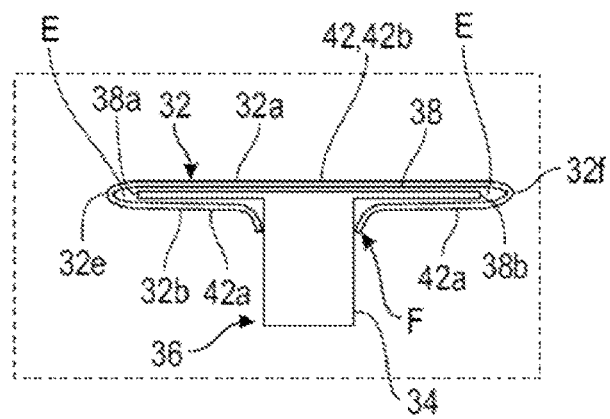
FIG. 8 is a schematic cross-sectional view along the line VIII-VIII of FIG. 6.
Figure 9:
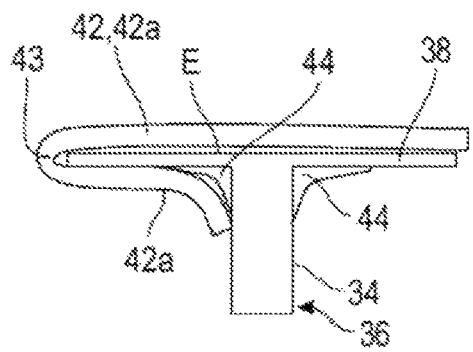
FIG. 9 is a view similar to FIG. 8 and illustrating an alternative embodiment of the disclosure.

The disclosure allows to remedy at least some of these problems and proposes a platform, one embodiment of which is shown in FIGS. 6 to 8.

The composite platform 30 comprises a wall 32 of elongated shape along an axis A and configured to extend between two fan vanes.

This wall 32 comprises an aerodynamic external face 32a and an internal face 32b on which is located a tab 34 for attachment to a fan disc.

The wall 32 further comprises an upstream edge 32c, a downstream edge 32d, a concavely curved lateral edge 32e, and a convexly curved lateral edge 32f. It is understood that the concavely curved edge 32e extends along an extrados of a vane, from the leading edge to the trailing edge of that vane, and that the convexly curved edge 32f extends along an intrados of an adjacent vane, from the leading edge to the trailing edge of that adjacent vane. At each of the axial ends of the wall 32, at the level of edges 32c, 32d, the wall may have a rim or form a step. These ends are intended to cooperate with the shrouds of the fan rotor, as mentioned above in connection with FIG. 1.

The attachment tab 34 is formed in one part with a metallic framework 36 that is at least partly integrated into the wall 32, this wall 32 being made by injecting a resin into a fibrous preform so that no attachment screws or the like are used.

The preform is made by three-dimensional weaving of fibres, for example by means of a Jacquard-type loom. The fibres are made of carbon, for example.

The framework 36 comprises a plate 38 that extends along a portion of the wall 32 and is connected to the attachment tab 34. From FIG. 7, it can be seen that the plate 38 extends away from the upstream 32c and downstream 32d ends of the wall 32. FIG. 8 shows that the plate 38 comprises two lateral edges 38a, 38b that are set back with respect to the lateral edges 32e, 32f of the wall 32.

The edges 32e, 32f of the wall 32 are thus made from the resin-injected preform and do not comprise any metallic portion of the plate 38, which is particularly important because these edges are likely to come into contact with a vane and be crushable by this vane in the event of the latter breaking. The "fuse" function of these edges is indeed an important criterion of these platforms for the safety criterion.

The framework 36 and in particular the plate 38 can be at least partly coated with a bonding primer or be subjected to a surface treatment, in order to improve the mechanical strength of the resin on the framework.

The framework 36 can be made of aluminium, titanium, or stainless steel and manufactured by casting, forging, stamping and welding, machining, electro-erosion or additive manufacturing, etc.

The resin of the wall 32 is preferably thermosetting or thermoplastic and is for example an epoxy resin.

The disclosure proposes a method for manufacturing this platform 30, which comprises the steps of:
a) making the preform 42 by three-dimensional weaving of fibres,
b) unbinding a portion of the fibres of the preform 42 along the axis A, from a longitudinal end of the preform, for example the downstream end 32d as illustrated in FIG. 7, so as to disengage at least one longitudinal layer 42a of fibres from the remainder 42b of the preform, this layer of fibres 42a being separated from the remainder 42b of the preform by a longitudinal space E,
c) inserting the framework 36 and in particular the plate 38 into this space E, from the end 32d to a desired position of the tab 34 along the axis A, and
d) injecting a thermosetting or thermoplastic resin into the preform 42 so as to form the wall 32 and to secure the framework 36 to this wall.

The injection can be done in several ways, for example: RTM injection, VA-RTM, polyflex, vacuum bagging, etc., these types of injection being known to the person skilled in the art in this field.

As can be seen in the drawings, only the plate 38 is inserted into the space E and covered by the layer 42a and more precisely the layers 42a arranged on both sides of the framework 36.

The attachment tab 34 extends through the slit F and opens into the space E which separates the two layers 42a. Each layer 42a has a free edge located on the side of the slit F and an opposite edge 43 that is connected by weaving into the remainder 42b of the preform.

The attachment tab 34 is preferably connected to the wall 38 by fillets 44 which are covered by portions of the layers 42a, and in particular the portions extending along the edges located on the side of the slit F. This prevents these layers and thus the fibres from being bent, which could create weak areas in the platform 30.

The disclosure provides several advantages:
- The use of a suitable metallic material (e.g., titanium or stainless steel) allows to avoid a galvanic coupling with the composite material selected for the wall 32, e.g., preform made of carbon fibre and epoxy resin.
- The integration of the framework in the preform, by unbinding a portion of the latter, allows to simplify the implementation as opposed to a cut in the centre of the preform into which the framework would be slipped, which would be a more complex and less reproducible operation.
- The integrity of the preform at the level of the lateral edges of the platform is advantageously (the continuity of the fibres is preserved around the perimeter of the framework) in order to improve the pull-out strength of the attachment tab 34. Ideally, a strong interlacing is recommended in this area to improve the pull-out strength of the framework. Since a part such as the platform is exposed to hailstones, the use of a highly interwoven weave also allows to reduce damage in the event of impact.
- The covering of the framework plate by layers of the preform is important to improve the service life of the part; a cluster of resin would be a privileged starting point for thermal and mechanical cracks. The shape of the contact between the preform and the framework, in particular at the level of the fillets 44, is designed to allow the preform to conform to its contour, thereby allowing to ensure the fibre content in this area and avoiding stress concentrations.
- The risk of buckling of the perform and the platform is reduced.
- An estimated weight saving of 10 to 20% per part, by eliminating screws, nuts, and washers. The mass of the platform can be minimized through an optimized design of the framework (thickening in constrained locations, possibility to dig/hollow out the framework, optimization of its shape and dimensions, etc.).
- A guarantee that the aerodynamic face 32a remains smooth over time, without air flow disturbance, following the elimination of the screws and a better holding of the part following an overall stiffening of the part due to the framework and/or the reinforcements and/or the stiffeners.

A gain in the price of the part that may not require a touch-up operation at the exit of the mould. It is no longer an assembly of several parts but a single part due to the integration of several functions (stiffeners, fusible edges, etc.).

A simplified mounting and manufacturing. The part being with finished dimensions, it can be mounted directly. Its geometry and dimensions are ensured by the mould. The final geometry is controlled because the positioning of the metallic framework directly in the mould allows to guarantee the reproducibility of the shape.

An improvement in the service life of the part since the clamping constraints are zero and the force passes through the metallic framework.

The invention claimed is:

1. A method for manufacturing a composite platform for an aircraft turbine engine fan, this platform comprising a wall of elongated shape and configured to extend between two fan vanes, this wall comprising an aerodynamic external face and an internal face on which is located an attachment tab configured to be attached to a fan disc, the method comprising the steps of:
a) making a preform by three-dimensional weaving of fibers, the preform having an elongated shape along an axis of elongation (A),
b) unbinding a portion of the fibers of the preform along said axis, from a longitudinal end of the preform, so as to disengage at least one longitudinal layer of fibers from a remainder of the preform, said at least one layer of fibers being separated from the remainder of the preform by a longitudinal space (E),
c) inserting a metallic framework into this longitudinal space, from said longitudinal end of the preform, the framework being formed in one part with said attachment tab and being positioned in said space according to a desired position of said tab, and
d) injecting a thermosetting or thermoplastic resin into the preform so as to form said wall and to secure the framework to said wall.

2. The method of claim 1, wherein the framework comprises a flat plate housed in said space (E) and interposed between said at least one layer and the remainder of the preform.

3. The method of claim 2, wherein the plate is interposed between two layers of fibers and the remainder of the preform, the two layers being coplanar and being separated from each other by a slit (F) which opens into said space (E) and through which said attachment tab extends.

4. The method of claim 2, wherein the attachment tab is connected to the plate by fillets that are covered by a portion of said at least one layer.

5. The method of claim 2, wherein said at least one layer is connected to the remainder of the preform by at least one woven edge.

6. A composite platform for an aircraft turbine engine fan, this platform being manufactured by a method of claim 1, the platform being devoid of mechanical elements for attaching the framework to the preform and to the platform, and said external face being devoid of orifices for mounting such elements.

7. The composite platform of claim 6, wherein the framework comprises a plate extending along the wall and connected to said attachment tab, said plate being spaced from upstream and downstream ends of the wall.

8. The composite platform of claim 6, wherein the wall comprises a lateral edge that is concave curved and an opposite lateral edge that is convex curved, the plate comprising two lateral edges that are set back from the lateral edges of the wall.

9. An aircraft turbine engine, comprising a fan comprising a disc carrying vanes and composite platforms of claim 6.

* * * * *